(12) United States Patent
Kim et al.

(10) Patent No.: US 8,900,737 B2
(45) Date of Patent: Dec. 2, 2014

(54) ENERGY STORAGE SYSTEM

(75) Inventors: Byoungju Kim, Yongin-si (KR);
Jeongdeok Byun, Yongin-si (KR);
Eunok Kwak, Yongin-si (KR);
Jongwook Yoon, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 43 days.

(21) Appl. No.: 13/547,020

(22) Filed: Jul. 11, 2012

(65) Prior Publication Data

US 2013/0065087 A1    Mar. 14, 2013

Related U.S. Application Data

(60) Provisional application No. 61/532,292, filed on Sep. 8, 2011.

(51) Int. Cl.
*H01M 2/10* (2006.01)
*H01M 10/46* (2006.01)
*H01M 10/0525* (2010.01)

(52) U.S. Cl.
CPC ........ *H01M 2/1016* (2013.01); *H01M 10/0525* (2013.01); *H01M 10/465* (2013.01)
USPC .............................. 429/123; 429/9

(58) Field of Classification Search
CPC .. H01M 2/1016; H01M 2/105; H01M 2/1077
USPC .......... 429/149–154, 157–160, 163
See application file for complete search history.

(56) References Cited

U.S. PATENT DOCUMENTS

| | | | | |
|---|---|---|---|---|
| 5,346,786 A | * | 9/1994 | Hodgetts | 429/159 |
| 5,806,948 A | * | 9/1998 | Rowan et al. | 312/293.3 |
| 6,328,513 B1 | * | 12/2001 | Niwa et al. | 411/339 |
| 2002/0192543 A1 | * | 12/2002 | Heimer | 429/158 |
| 2004/0185339 A1 | * | 9/2004 | Jones | 429/177 |
| 2005/0208375 A1 | | 9/2005 | Sakurai | |
| 2006/0152906 A1 | * | 7/2006 | Miller | 361/716 |
| 2007/0178369 A1 | * | 8/2007 | Conrardy et al. | 429/100 |
| 2009/0078665 A1 | * | 3/2009 | Sandusky et al. | 211/208 |
| 2009/0169978 A1 | * | 7/2009 | Smith et al. | 429/82 |
| 2010/0065467 A1 | * | 3/2010 | Murata | 206/710 |

FOREIGN PATENT DOCUMENTS

JP            07-226266 A        8/1995

(Continued)

OTHER PUBLICATIONS

English Machine Translation of JP Publication No. 2002-298806A dated Oct. 11, 2002 13 pages.

(Continued)

*Primary Examiner* — Ula C. Ruddock
*Assistant Examiner* — Scott J Chmielecki
(74) *Attorney, Agent, or Firm* — Christie, Parker & Hale, LLP

(57) ABSTRACT

An energy storage system including a battery cell, a tray for receiving the battery cell, and a rack for receiving the tray. The rack includes a connector unit. The connector unit is configured to connect to the tray inserted into the rack and to vibrate together with the tray when the tray vibrates due to, for example, an earth quake or external impact applied to the rack, thereby preventing an electric connection between the tray and the connector unit from being broken.

20 Claims, 7 Drawing Sheets

(56) References Cited

FOREIGN PATENT DOCUMENTS

| | | |
|---|---|---|
| JP | 2002-298806 A | 10/2002 |
| JP | 2010-186568 A | 8/2010 |
| KR | 10-2001-0045245 A | 6/2001 |
| KR | 10-2005-0093699 A | 9/2005 |
| KR | 10-2007-0054957 A | 5/2007 |
| KR | 10-0776767 B1 | 11/2007 |

OTHER PUBLICATIONS

KIPO Office Action dated Jul. 22, 2013, for corresponding KR Application No. 10-2012-0078442 (4 pages).

Machine English Translation of JP 07-226266 A (8 pages). Aug. 22, 1995.

Machine English Translation of JP 2010-186568 A (13 pages). Aug. 26, 2010.

\* cited by examiner

ENERGY STORAGE SYSTEM

CROSS-REFERENCE TO RELATED APPLICATION

This application claims the benefit of and priority to U.S. Provisional Application No. 61/532,292, filed on Sep. 8, 2011, in the United States Patent and Trademark Office, the disclosure of which is incorporated herein in its entirety by reference.

BACKGROUND

1. Field

Embodiments of the present invention relate to an energy storage system.

2. Description of Related Art

An energy storage system may be linked with a renewable energy system, such as a solar cell, and may be configured to store power when electric power demand is low and to use the stored power at a time when electric power demand is high. For example, the energy storage system may be an energy storage device including a quantity of secondary batteries used in electronic devices, such as cellular phones or notebook computers.

The secondary batteries may be received in a plurality of trays, which may be received in a plurality of racks, which may then be received in a container box.

An issue with energy storage systems is that they are susceptible to damage caused by vibrations due to, for example, earthquakes or external impacts. For example, vibrations can cause breaks in electrical connections between the trays and the rack.

SUMMARY

Aspects of embodiments of the present invention are directed toward an energy storage system including a connector unit installed in a rack to be connected to a tray and vibrating together when the tray vibrates due to, for example, an earthquake or external impact applied to the rack, thereby preventing an electric connection between the tray and the connector unit from being broken.

Aspects of embodiments of the present invention are directed toward an energy storage system including elastic members and an anchor installed in a rack to suppress or prevent vibrations due to, for example, an earthquake or external impact applied to the rack; thereby preventing an electric connection between the tray and the rack from being broken.

An embodiment of the present invention includes an energy storage system, which includes a battery cell, a tray for receiving the battery cell, and a rack for receiving the tray. The rack includes a connector unit, the connector unit being configured to connect to the tray inserted into the rack and to vibrate together with the tray.

The connector unit may include a base plate having a plurality of fastening openings; a plurality of floating washers; and a plurality of fasteners. Here, in one embodiment, each of the floating washers has a portion located within a corresponding one of the fastening openings.

In one embodiment, each of the floating washers has a washer head, a washer body, and a washer opening. Here, the washer body has a smaller size than that of the washer head, and the washer opening is positioned through the washer head and the washer body to allow a corresponding one of the fasteners to penetrate the washer head and the washer body. Further, the size of the washer body is smaller than the size of a corresponding one of the fastening openings.

The rack may further include a connection plate. Here, in one embodiment, each of the fasteners is connected to the connection plate through a corresponding one of the floating washers and a corresponding one of the fastening openings.

Each of the fasteners may have a fastening head and a fastening body. The fastening head may have a larger size than that of the washer opening. The fastening body may be configured to pass through the washer opening and connect to the connection plate.

In one embodiment, the connector unit further includes a communication socket configured to receive a communication terminal of the tray; a power socket configured to receive a power terminal of the tray; and a guide wall located on a side of the base plate facing the tray inserted into the rack, and surrounding the communication socket and the power socket.

The connector unit may further include a reverse insertion preventing protrusion configured to block the tray from being reversely inserted into the rack.

The rack may further include a shelf configured to receive the tray; a housing enclosing the shelf; and a plurality of elastic members at sides of the shelf for facilitating the insertion of the tray, absorbing vibration applied to the rack, and securing the tray with an elastic force.

The housing may include a top frame; a bottom frame; a first side frame connected to the top frame and the bottom frame; and a second side frame connected to the top frame and the bottom frame. The shelf may be at a space defined by the top frame, the bottom frame, the first side frame, and the second side frame. The shelf, the top frame, the bottom frame, the first side frame and the second side frame may define a space in the rack configured to receive the tray.

The tray may be a plurality of trays, and the shelf may be a plurality of shelves. The housing may further include a middle frame between the first side frame and the second side frame, the middle frame being connected to the top frame and the bottom frame. The middle frame and the shelves may define spaces in the rack configured to receive the trays.

In one embodiment, the elastic members are plate springs.

The energy storage system may further include support plates at sides of the shelf. The elastic members may be on the support plates.

The shelf may have an opening configured to facilitate dissipation of heat from the tray.

The battery cell may be a plurality of battery cells. The tray may include a first case having an internal space configured to receive the battery cells; a partition wall in the first case configured to separate the battery cells; and a second case configured to engage with the first case to enclose the battery cells.

The rack may further include an anchor at an outer surface of the rack for securing the rack to an external surface and reducing the vibration applied to the rack.

The anchor may include a lower anchor at a bottom surface of the rack, and an upper anchor at a top-rear surface of the rack.

The energy storage system may further include a moving member for moving the rack laterally located at a bottom surface of the rack.

The energy storage system may further include an adjustment member for adjusting the height of the rack.

The energy storage system may further include a switch box for connecting power in the energy storage system, and a battery management box for controlling charging and discharging of the battery cell, controlling communications with the tray, and monitoring states of the battery cell. The switch box may include a protection circuit. The switch box and the battery management box may be configured to have the same shape as the tray and to be received in the rack.

The tray may be a plurality of trays, and the connector unit may be a plurality of connector units. Each of the connector units may be configured to connect to a corresponding one of the trays inserted into the rack and to vibrate together with the corresponding one of the trays.

DETAILED DESCRIPTION

Figure 1:
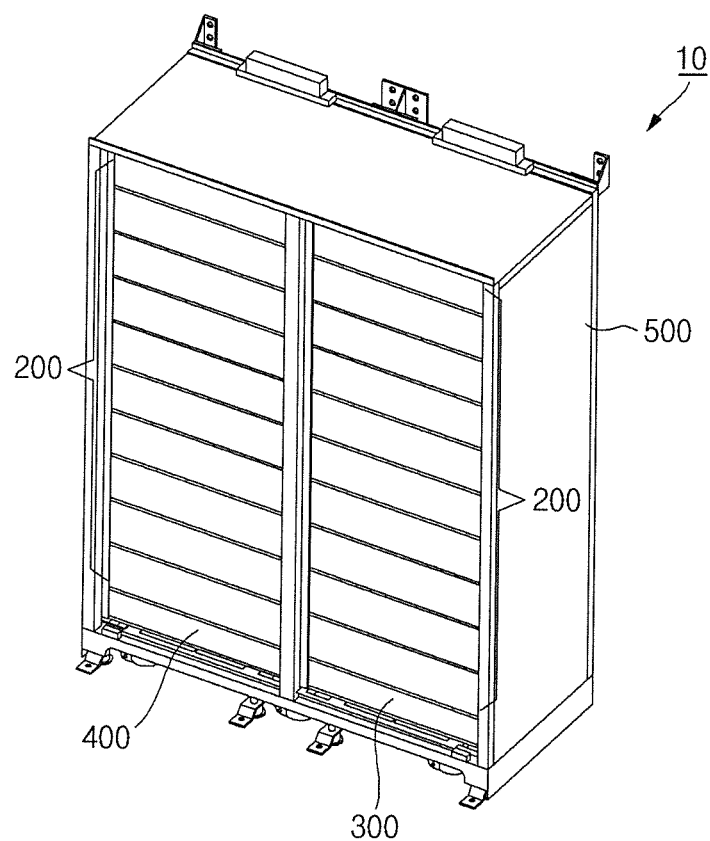
FIG. 1 is a perspective view of an energy storage system according to an embodiment of the present invention.

Hereinafter, embodiments according to the present invention will be described with reference to the accompanying drawings. Throughout the specification, the same reference numerals refer to the same elements. Here, when it is stated that one element is "connected"/"coupled" to another element, the one element may be directly connected/coupled to the other element, or may be indirectly connected/coupled to the other element via one or more intervening elements. Further, some of the elements that are not essential to the complete understanding of the invention are omitted for clarity.

Figure 2:
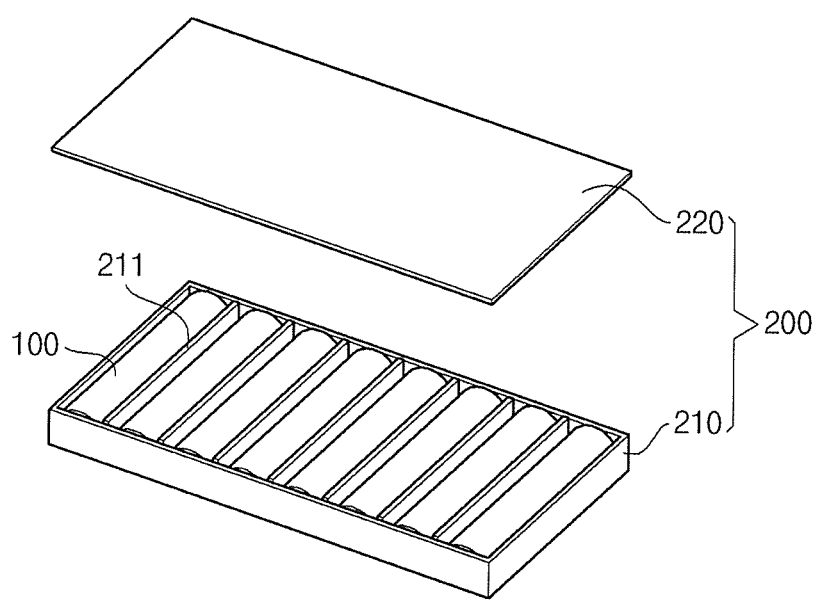
FIG. 2 is a perspective view of battery cells received in a tray shown in FIG. 1.

FIG. 1 is a perspective view of an energy storage system according to an embodiment of the present invention, and FIG. 2 is a perspective view of battery cells received in a tray shown in FIG. 1.

Referring to FIGS. 1 and 2, the energy storage system 10 according to an embodiment of the present invention includes a plurality of battery cells 100, a plurality of trays 200, a switch box 300, a battery management box 400, and a rack 500. The energy storage system 10 may be linked with an energy and power system (e.g., a renewable energy system, such as a solar cell), which allows the plurality of battery cells 100 to receive electric power from the energy and power system. The energy storage system 10 may also be linked to an external load. Although not shown, the energy storage system 10 may include circuits such as an inverter or a converter, to receive/supply the electric power from/to the energy and power system (e.g., a solar cell) or an external load.

The battery cells 100 are rechargeable batteries (e.g., lithium ion battery cells), but aspects of the present invention are not limited thereto. While FIG. 2 shows that 8 battery cells 100 are received in one tray 200, the number of battery cells 100 received in the tray 200 may be adjusted according to the output desired. In addition, while FIG. 2 shows that the battery cells 100 are cylindrical battery cells, they may be prismatic battery cells or pouch-type battery cells.

The trays 200 are received in the rack 500 and each includes a first case 210 and a second case 220. The first case 210 may have a box shape having an internal space and may include a plurality of partition walls 211 to receive and separate the plurality of battery cells 100 in the internal space. The second case 220 may have a plate shape. The second case 220 is configured to engage with the first case 210 to enclose the plurality of battery cells 100 received therein. The first case 210 and the second case 220 may be made of an insulating material such as plastic. While FIG. 1 shows that 20 trays 200 are received in one rack 500, the number of trays 200 received in the rack 500 may be adjusted according to the size of the rack 500. Although not shown, each of the trays 200 may have a built-in battery management system (BMS) for controlling charging and discharging of the battery cells 100.

The switch box 300 may have the same shape as the trays 200 and may be received in the rack 500. The switch box 300 includes a protection circuit device for protecting the battery cells 100. For example, the protection circuit device may be a fuse or a switch that cuts off the flow of current when the current flowing in the battery cells 100 exceeds a current allowance limit of the battery cells 100.

The battery management box 400 may have the same shape as the tray 200 and may be received in the rack 500. The battery management box 400 includes a communications controller for controlling communications with the trays 200. The battery management box 400 may monitor states of the battery cells 100 received in the trays 200 through the communications controller.

The rack 500 is formed to receive the plurality of trays 200, the switch box 300 and the battery management box 400. The rack 500 may be made of a high-strength material, such as iron or steel. The rack 500 may include a plurality of racks to be disposed in a container box (not shown). The rack 500 will now be described in detail.

Figure 3:
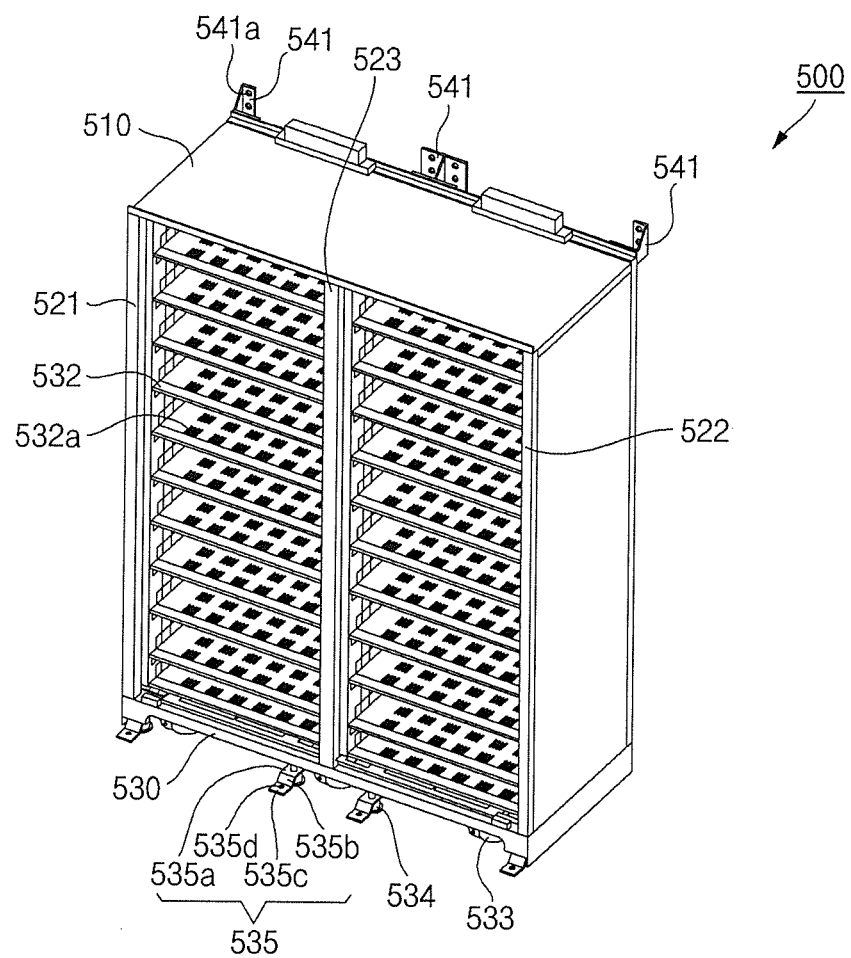
FIG. 3 is a perspective view of a rack shown in FIG. 1.
Figure 4:
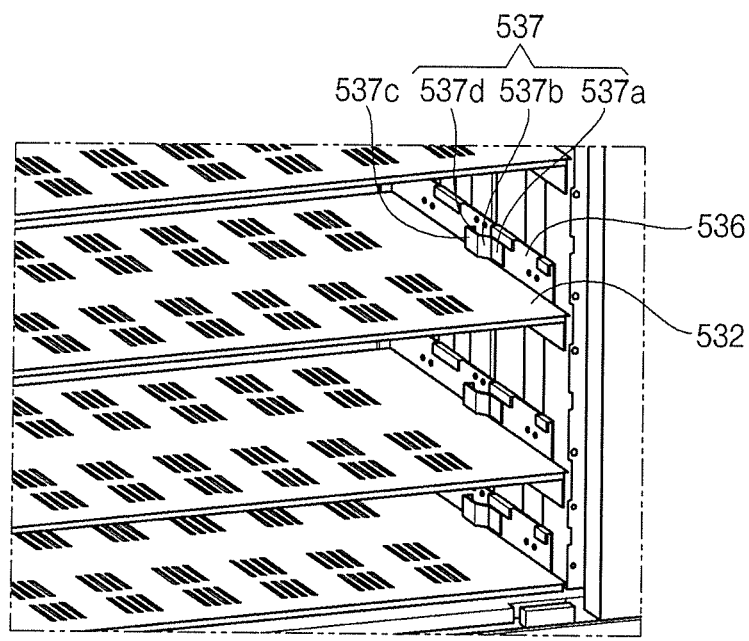
FIG. 4 is a perspective view of an elastic member of the rack shown in FIG. 3.
Figure 5:
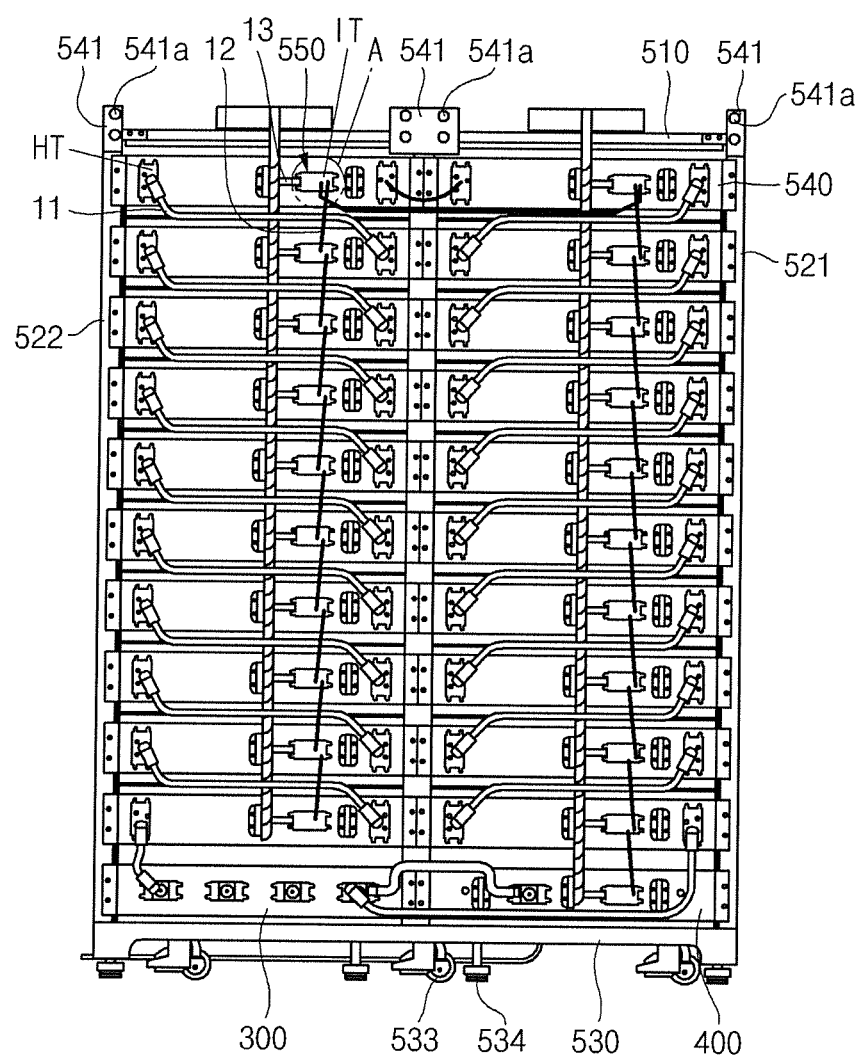
FIG. 5 is a rear view illustrating a rear surface of the rack shown in FIG. 1.

FIG. 3 is a perspective view of a rack shown in FIG. 1, FIG. 4 is a perspective view of an elastic member of the rack shown in FIG. 3, and FIG. 5 is a rear view illustrating a rear surface of the rack shown in FIG. 1.

Referring to FIGS. 3 to 5, the rack 500 includes a top frame 510, a first side frame 521 and a second side frame 522 connected to both sides of the top frame 510, and a bottom frame 530 connected to the first side frame 521 and the second side frame 522. Here, the top frame 510 is perpendicular to the first side frame 522 and the second side frame 524, and is parallel with the bottom frame 530. The top frame 510, the first side frame 521, the second side frame 522, and the bottom frame 530 form an internal space of the rack 500.

In addition, the rack 500 includes a middle frame 523 installed in a space between the first side frame 521 and the second side frame 522 to be parallel with the first side frame 521 and the second side frame 522, and a plurality of shelves 532 installed in a space between the top frame 510 and the bottom frame 530 to be parallel with the top frame 510 and the bottom frame 530. Here, each of the plurality of shelves 532 may include a plurality of openings (e.g., holes) 532a for emitting heat generated, for example, during charging or discharging of the battery cells 100 received in the trays 200. The middle frame 523 and the plurality of shelves 532 form a space in the rack 500 for receiving the plurality of trays 200, the switch box 300 and the battery management box 400.

In addition, the rack 500 may include moving members (e.g., wheels) 533 installed at a bottom of the bottom frame 530 to freely move the rack 500.

The rack 500 may include height adjustment members 534 and a lower fixing member (e.g., a lower anchor) 535 formed at corner portions and both sides of a region corresponding to the middle frame 523 on the bottom of the bottom frame 530. The height adjustment members 534 may be, for example, substantially bolt shaped and move upward or downward when rotated. The lower fixing member 535 may include a support surface 535a, a bent surface 535b and a fixed surface 535c. The support surface 535a faces a bottom surface of the bottom frame 530 and is parallel with the bottom surface of the bottom frame 530. In addition, the support surface 535a has passing-through holes to allow the height adjustment members 534 to pass. The bent surface 535b is downwardly bent and extends from one end of the support surface 535a. The fixed surface 535c is bent and extends from one end of the bent surface 535b to be parallel with the bottom surface of the bottom frame 530. Here, the support surface 535a and the bent surface 535b are roughly overlapped with each other in a direction perpendicular to the bottom surface of the bottom frame 530. The fixed surface 535c is not overlapped with the bottom surface of the bottom frame 530 in a perpendicular direction, and has a penetration opening (e.g., hole) 535d through which a fastener (e.g., a screw, or a bolt) (not shown) penetrates. The lower fixing member 535 securely fixes the rack 500 to an external surface (e.g., a floor or a bottom of a container box), and absorbs (e.g., dampens) or reduces vibration applied to the rack 500 due to, for example, an earthquake or external impact, thereby suppressing the effect that vibration has on the rack 500. Here, the height adjustment members 534 move up and down when the rack 500 moves up and down, to allow the rack 500 to move up and down together with the lower fixing member 535, thereby allowing the rack 500 to freely move.

In addition, the rack 500 may include support plates 536 at both sides of the plurality of shelves 532. Additionally, elastic members 537 may be on the support plates 536. The support plates 536 are perpendicular to the shelves 532 and provide for spaces in which the elastic members 537 may be installed. The elastic members 537 may be, for example, plate springs, and each of the elastic members 537 may include a coupling surface 537a, a first extending surface 537b, a second extending surface 537c, and a third extending surface 537d. The coupling surface 537a is coupled to the support plate 536 and is parallel with the support plate 536. The first extending surface 537b is bent from one end of the coupling surface 537a inwardly with respect to the rack 500 and extends in a direction in which the trays 200 are inserted into the rack 500. The second extending surface 537c is bent from one end of the first extending surface 537b to be parallel with the coupling surface 537a and extends in a direction in which the trays 200 are inserted into the rack 500. The third extending surface 537d is bent and extends from one end of the second extending surface 537c away from the trays 200. The elastic member 537 facilitates insertion of the trays 200 and fixes or secures the inserted trays 200 using an elastic force. In addition, the elastic member 537 absorbs or suppresses vibration applied to the rack 500 due to, for example, an earthquake or external impact, thereby suppressing the effect that vibration has on the rack 500.

In addition, the rack 500 may include a plurality of connection plates 540. The connection plates 540 may be on the rack's rear surface, for example at rear surfaces of the first side frame 521 and the second side frame 522. Each of the plurality of connection plates 540 may have one side connected to the first side frame 521 or the second side frame 520 so as to correspond to each of the plurality of trays 200 inserted into the rack 500, and the other side may be connected to the middle frame 523.

Further, the rack 500 may include upper fixing members (e.g., upper anchors) 541 installed on a rear surface of the top frame 510. The upper fixing members 541 extend upwardly from both sides and a middle region of the rear surface of the top frame 510, and have penetration openings (e.g., holes) 541a through which fasteners (e.g., screws or bolts) (not shown) penetrate. The upper fixing members 541 are formed by connecting a plurality of surfaces. The upper fixing members 541 securely fix the rack 500 to an external surface (e.g., a wall or a container box), and absorb or suppress vibration applied to the rack 500 due to, for example, an earthquake or external impact together with the lower fixing member 535, thereby suppressing the effect that vibration has on the rack 500.

In addition, the rack 500 includes a plurality of connector units 550. The connector units may be installed at the plurality of connection plates 540. Each of the connector units 550 may include, for example, a high current terminal HT, a communication and power terminal IT, etc. The high current terminal HT provides for a path for supplying electric power to the plurality of trays 200 inserted into the rack 500. The communication and power terminal IT allows for communications between the plurality of trays inserted into the rack 500 and provides for a path for supplying electric power to the battery management unit included in each of the plurality of trays 200. Here, a high current wire 11 is connected to the high current terminal HT, and a communication wire 12 and a power wire 13 are connected to the communication and power terminal IT. The connector unit 550 will now be described in detail with regard to the communication and power terminal IT by way of example.

Figure 6:
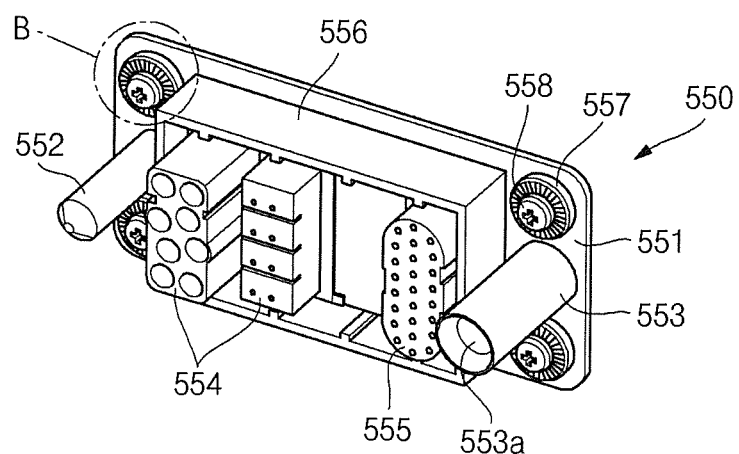
FIG. 6 is a perspective view of a connector unit in an 'A' portion of FIG. 5.
Figure 7:
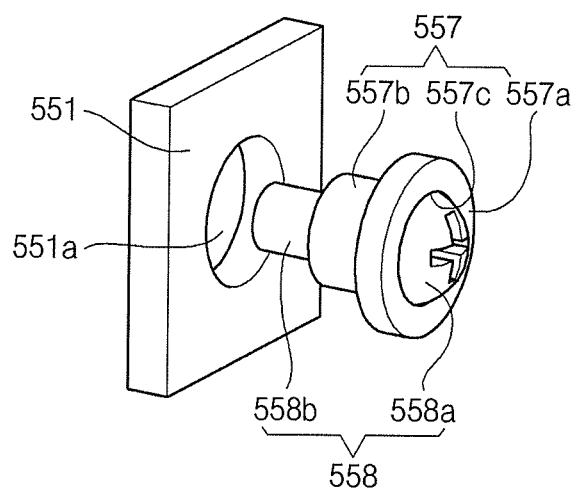
FIG. 7 is an exploded perspective view of a base plate and a floating washer in a 'B' portion of FIG. 6.

FIG. 6 is a perspective view of a connector unit in an 'A' portion of FIG. 5, and FIG. 7 is an exploded perspective view of a base plate and a floating washer in a 'B' portion of FIG. 6.

Referring to FIGS. 6 and 7, the connector unit 550 includes a base plate 551, a first reverse insertion preventing protrusion 552, a second reverse insertion preventing protrusion 553, a communication socket 554, a power socket 555, a guide wall 556, a floating washer 557 and a fastener (e.g., a screw or a bolt) 558.

The base plate 551 forms a base of the connector unit 550 and contacts the plurality of connection plates 540. The base plate 551 may be made of an insulating material, such as plastic.

The first reverse insertion preventing protrusion 552 is formed at one side of the base plate 551 and may have a pillar shape protruding from the base plate 551 toward the trays 200 inserted into the rack 500. The first reverse insertion preventing protrusion 552 prevents the trays 200 from being reversely inserted into the rack 500. Although not shown, each of the trays 200 may have an opening (e.g. a hole) located to correspond to the first reverse insertion preventing protrusion 552 to be engaged with the first reverse insertion preventing protrusion 552 when inserted into the rack 500.

The second reverse insertion preventing protrusion 553 is formed at the other side of the base plate 551 and may have a pillar shape protruding from the base plate 551 toward the trays 200 inserted into the rack 500. The second reverse insertion preventing protrusion 553, in cooperation with the first reverse insertion preventing protrusion 552, prevents or blocks the trays 200 from being reversely inserted into the rack 500. Although not shown, the tray 200 may have an opening (e.g., a hole) located to correspond to the second reverse insertion preventing protrusion 553 to be engaged with a hollow 553a of the second reverse insertion preventing protrusion 553 when inserted into the rack 500.

The communication socket 554 has one surface into which the communication terminal of the tray 200 is inserted and another surface into which the wire 12 is inserted.

The power socket 555 has one surface into which the power terminal of the tray 200 is inserted, and another surface into which the power wire 13 is inserted.

The guide wall 556 is formed on a surface of the base plate 551 facing the trays 20 inserted into the rack 500 so as to surround the communication socket 555 and the power socket 555.

The floating washer 557 has a washer head 557a, a washer body 557b, and a washer opening (e.g., hole) 557c. The washer body 557b has a smaller size (e.g., diameter) than the washer head 557a and is connected to the washer head 557a. The washer head 557a and/or the washer body 557b may have a substantially cylindrical shape. The washer opening 557c is formed across the washer head 557a and the washer body 557b to allow the fastener 558 to penetrate the floating washer 557.

The fastener 558 has a fastener head 558a and a fastener body 558b. The fastener head 558a is hung on the washer head 557a, and the fastener body 558b passes through the washer opening 557c and a fastening opening (e.g., hole) 551a of the base plate 551 to then be connected to the connection plate 540. A connection mechanism of the base plate 551 and the floating washer 557 will now be described.

Figure 8:
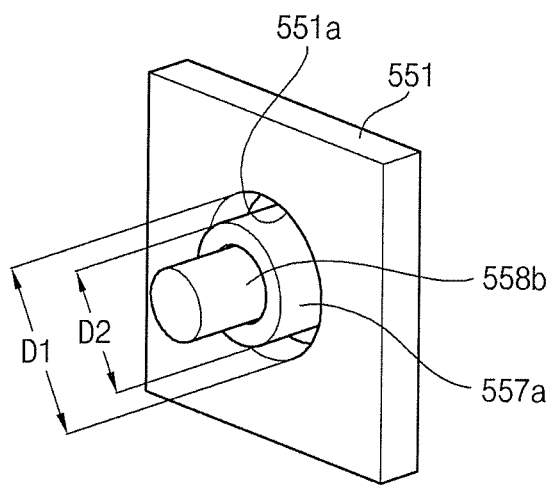
FIG. 8 is an assembled perspective view of the base plate and the floating washer shown in FIG. 7.

FIG. 8 is an assembled perspective view of the base plate and the floating washer shown in FIG. 7.

Referring to FIG. 8, a size (e.g., diameter) D1 of the fastening opening 551a of the base plate 551 is larger than a size (e.g., diameter) D2 of the washer body 557b of the floating washer 557. This is for the purpose of creating a distance between the base plate 551 and the washer body 557b. The distance may prevent or protect an electrical connection between the trays 200 and the connector unit 550 from being broken or opened by the connector unit 550 vibrating when the trays 200 vibrate due to, for example, an earthquake or external impact applied to the rack 500.

In one embodiment, a difference between the size (e.g., diameter) D1 of the fastening opening 551a and the size (e.g., diameter) D2 of the washer body 557b may be in a range of about 3 mm to about 7 mm. Here, in one embodiment, if the difference between the size D1 of the fastening opening 551a and the size D2 of the washer body 557b is less than 3 mm, the trays 200 vibrate more than the connector unit 550 due to vibration applied to the rack 500, so that the electric connections between the trays 200 and the connector units 550 may be more likely to break or open. Further, in another embodiment, if the difference between the size D1 of the fastening opening 551a and the size D2 of the washer body 557b is greater than 7 mm, a coupling strength between the rack 500 and the connector unit 550 is insufficient.

As described above, the energy storage system 10 according to an embodiment of the present invention includes the connector unit 550 installed in the rack 500 to be connected to the trays 200 and vibrating together when the trays 200 vibrate due to, for example, an earthquake or external impact applied to the rack 500, thereby preventing electric connections between the trays 200 and the connector units 550 from being broken.

In addition, the energy storage system 10 according to an embodiment of the present invention may include the first and second reverse insertion preventing protrusions 552 and 553 formed in each of the connector units 550, thereby preventing the trays 200 from being reversely inserted into the rack 500.

Further, since the energy storage system 10 according to an embodiment of the present invention may include the lower and upper fixing members 535 and 541, the rack 500 may be securely fixed to an external object (e.g., to a container box). In addition, vibration applied to the rack 500 due to, for example, an earthquake or external impact applied to the rack 500 can be absorbed or suppressed, thereby suppressing the effect vibration has on the rack 500.

In addition, since the energy storage system 10 according to an embodiment of the present invention may include the elastic member 537 installed in the rack 500, the trays 200 can be easily inserted into the rack 500 and the inserted trays 200 can be elastically fixed or secured. In addition, the elastic members can absorb or suppress vibrations applied to the rack 500.

Although the present invention has been described with reference to certain embodiments thereof, it will be understood by those skilled in the art that a variety of modifications and variations may be made to the present invention without departing from the spirit or scope of the present invention defined in the appended claims, and their equivalents.

| DESCRIPTION OF THE SYMBOLS IN THE DRAWINGS | |
| --- | --- |
| 10: Energy storage system | 11: High current wire |
| 12: Communication wire | 13: Power wire |
| 100: Battery cells | 200: Trays |
| 300: Switch box | 400: Battery management box |
| 500: Rack | 510: Top frame |
| 521: First side frame | 522: Second side frame |
| 522: Middle frame | 530: Bottom frame |
| 532: Shelf | 533: Moving member |
| 534: Height adjustment member | 535: Lower fixing member |
| 536: Support plate | 537: Elastic member |
| 540: Connection plate | 541: Upper fixing member |
| 550: Connector unit | 551: Base plate |
| 552: First reverse insertion preventing protrusion | |
| 553: Second reverse insertion preventing protrusion | |
| 554: Communication socket | 555: Power socket |
| 556: Guide wall | 557: Floating washer |
| 558: Fastener | |

What is claimed:

1. An energy storage system comprising:
a battery cell;
a tray for receiving the battery cell; and
a rack for receiving the tray, the rack comprising:
   a connection plate fastened to the rack, and
   a connector unit configured to electrically connect to the tray inserted into the rack and to move together with the tray to prevent electrical connections between the tray and the connector unit from being broken, wherein the connector unit comprises a base plate connected to the connection plate, the base plate configured to contact the connection plate and to move relative to the connection plate in a direction parallel to a plane on which the base plate is connected to the connection plate.

2. The energy storage system of claim 1, wherein the connector unit further comprises:
the base plate having a plurality of fastening openings;
a plurality of floating washers; and
a plurality of fasteners, wherein:
each of the floating washers has a portion located within a corresponding one of the fastening openings.

3. The energy storage system of claim 2, wherein each of the floating washers has a washer head, a washer body, and a washer opening, wherein:
the washer body has a smaller size than that of the washer head;
the washer opening is positioned through the washer head and the washer body to allow a corresponding one of the fasteners to penetrate the washer head and the washer body; and the size of the washer body is smaller than the size of a corresponding one of the fastening openings.

4. The energy storage system of claim 3; wherein each of the fasteners is connected to the connection plate through a corresponding one of the floating washers and a corresponding one of the fastening openings.

5. The energy storage system of claim 4, wherein each of the fasteners has a fastening head and a fastening body, wherein:
the fastening head has a larger size than that of the washer opening; and
the fastening body is configured to pass through the washer opening and connect to the connection plate.

6. The energy storage system of claim 2, wherein the connector unit further comprises:
a communication socket configured to receive a communication terminal of the tray;
a power socket configured to receive a power terminal of the tray; and
a guide wall, the guide wall being located on a side of the base plate facing the tray inserted into the rack, and surrounding the communication socket and the power socket.

7. The energy storage system of claim 1, wherein the connector unit further comprises a reverse insertion preventing protrusion configured to block the tray from being reversely inserted into the rack.

8. The energy storage system of claim 1, wherein the rack further comprises:
a shelf configured to receive the tray;
a housing enclosing the shelf; and
a plurality of elastic members at sides of the shelf for facilitating the insertion of the tray, absorbing vibration applied to the rack, and securing the tray with an elastic force.

9. The energy storage system of claim 8, wherein the housing comprises:
a top frame;
a bottom frame;
a first side frame connected to the top frame and the bottom frame; and
a second side frame connected to the top frame and the bottom frame, wherein:
the shelf is at a space defined by the top frame, the bottom frame, the first side frame, and the second side frame; and
the shelf, the top frame, the bottom frame, the first side frame and the second side frame define a space in the rack configured to receive the tray.

10. The energy storage system of claim 9, further comprising:
a plurality of trays comprising the tray; and
a plurality of shelves comprising the shelf, and
wherein the housing further comprises:
a middle frame between the first side frame and the second side frame, the middle frame being connected to the top frame and the bottom frame, wherein the middle frame and the shelves further define the spaces in the rack configured to receive the trays.

11. The energy storage system of claim 8, wherein the elastic members are plate springs.

12. The energy storage system of claim 8, further comprising support plates at sides of the shelf, wherein the elastic members are on the support plates.

13. The energy storage system of claim 8, wherein the shelf has an opening configured to facilitate dissipation of heat from the tray.

14. The energy storage system of claim 1, wherein:
the battery cell comprises a plurality of battery cells; and
the tray comprises:
a first case having an internal space configured to receive the battery cells;
a partition wall in the first case configured to separate the battery cells; and
a second case configured to engage with the first case to enclose the battery cells.

15. The energy storage system of claim 1, wherein the rack further comprises an anchor at an outer surface of the rack for securing the rack to an external surface and reducing the vibration applied to the rack.

16. The energy storage system of claim 15, wherein the anchor comprises:
a lower anchor at a bottom surface of the rack, and
an upper anchor at a top-rear surface of the rack.

17. The energy storage system of claim 1, further comprising a moving member for moving the rack laterally located at a bottom surface of the rack.

18. The energy storage system of claim 1, further comprising an adjustment member for adjusting the height of the rack.

19. The energy storage system of claim 1, further comprising:
a switch box for connecting power in the energy storage system, the switch box comprising a protection circuit; and
a battery management box for controlling charging and discharging of the battery cell, controlling communications with the tray, and monitoring states of the battery cell, wherein
the switch box and the battery management box are configured to have the same shape as the tray and to be received in the rack.

20. The energy storage system of claim 1, further comprising
a plurality of trays comprising the tray; and
a plurality of connector units comprising the connector unit, each of the connector units being configured to connect to a corresponding one of the trays inserted into the rack and to vibrate together with the corresponding one of the trays.

* * * * *